United States Patent [19]

Mahanay et al.

[11] Patent Number: 5,823,661
[45] Date of Patent: Oct. 20, 1998

[54] FUSED GLASS LIGHT PATTERN GENERATOR

[75] Inventors: Steven T. Mahanay; Byron J. Ziegler, both of Austin, Tex.

[73] Assignee: High End Systems, Inc., Austin, Tex.

[21] Appl. No.: 301,967

[22] Filed: Sep. 7, 1994

[51] Int. Cl.$^6$ .................................................. F21V 9/00
[52] U.S. Cl. ........................ 362/293; 362/326; 362/811
[58] Field of Search .................................. 362/293, 811, 362/332, 326; 353/84, 1

[56] References Cited

U.S. PATENT DOCUMENTS

| | | | |
|---|---|---|---|
| 2,721,256 | 10/1955 | Duhon | 362/811 |
| 5,144,524 | 9/1992 | Tullis et al. | 362/293 |
| 5,580,164 | 12/1996 | Maddox et al. | 362/293 |

FOREIGN PATENT DOCUMENTS

| | | |
|---|---|---|
| 1203464 | 8/1970 | United Kingdom . |
| 1246566 | 9/1971 | United Kingdom . |
| 1536328 | 12/1978 | United Kingdom . |

*Primary Examiner*—Stephen F. Husar

[57] ABSTRACT

A fused glass light pattern generator in the form of a disc-shaped gobo including fused glass particles of various size and shape. The fused particles have an uneven, multi-level surface sufficient to distort light in response to a light beam being passed through the gobo. The particles may include color producing substances or color may be added to the light beam. The result is an enhanced artistic effect when the images, which are also movable, are projected onto a projection surface which may be a solid surface or theatrical fog.

6 Claims, 4 Drawing Sheets

FIG. 2
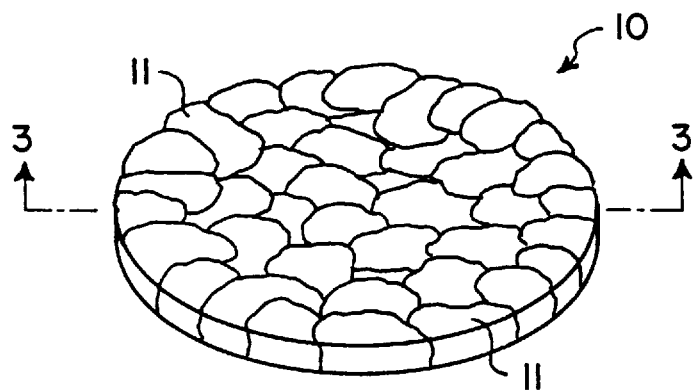
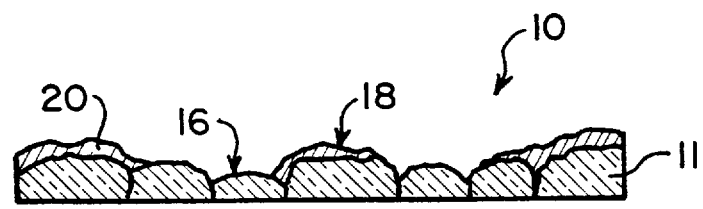
FIG. 3

FIG. 4
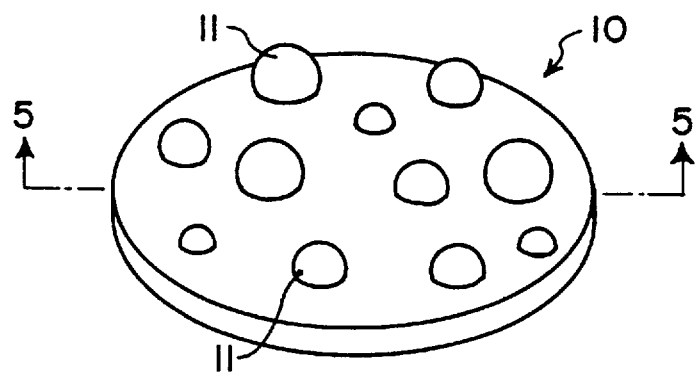
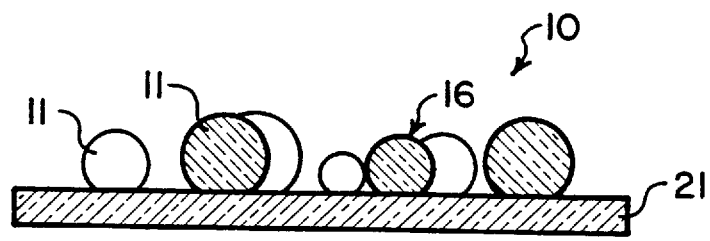
FIG. 5

FUSED GLASS LIGHT PATTERN GENERATOR

FIELD OF THE INVENTION

This invention relates generally to stage and theater lighting and specifically to projecting light produced images by passing a beam of light through a fused glass light pattern generator or gobo used in a light fixture for producing colored light patterns.

BACKGROUND OF THE INVENTION

One commonly used gobo comprises a sheet of metal having a desired image cut out of the sheet. When the sheet is placed in a beam of light, the portion of the beam that passes through the sheet is shaped to correspond to the image.

Another commonly used gobo for creating artistic lighting effects comprises a metal coated glass disc with a portion of the coating etched in the shape of an image. When the disc is placed in a beam of light, the portion of the beam that passes through the disc is shaped to correspond to the image.

When these gobos are used in combination with color wheels commonly known in light fixtures, various lighting effects are achieved through the variation of moving shapes and changing color. However, the images are planar geometric forms which do not realize their full artistic potential.

The foregoing illustrates limitations of the known prior art. Thus, it is apparent that it would be advantageous to provide an alternative directed to overcoming one or more of the limitations as set forth above. Accordingly, a suitable alternative is provided including features and benefits more fully disclosed hereinafter.

SUMMARY OF THE INVENTION

In one aspect of the present invention, this is accomplished by providing a light pattern generator comprising a disc-shaped gobo including a plurality of fused glass particles of various size such that the gobo has an uneven, multi-level surface sufficient to distort light in response to a beam of light being passed therethrough.

In another aspect of this invention, this is accomplished by providing a fused glass light pattern generator image projection system comprising a light source suitable to project a beam of light onto a projection surface. A gobo selection device is positioned to move a selected gobo into the beam of light. A color selection device is positioned to move a selected color filter into the beam of light. A gobo is carried by the gobo selection device. The gobo includes a plurality of fused glass particles of various size such that the gobo has an uneven, multi-level surface sufficient to distort the beam of light and the resulting image projected by the beam onto the surface.

The foregoing and other aspects will become apparent from the following detailed description of the invention when considered in conjunction with the accompanying drawing figures. It is to be expressly understood, however, that the figures are not intended as a definition of the invention, but are for the purpose of illustration only.

BRIEF DESCRIPTION OF THE DRAWING FIGURES

FIG. 2 is a perspective view illustrating an embodiment of the gobo of the present invention;

FIG. 3 is a cross-sectional view taken along line 3—3 of FIG. 2;

FIG. 4 is a perspective view illustrating another embodiment of the gobo of the present invention;

FIG. 5 is a cross-sectional view taken along the line 5—5 of FIG. 4;

DETAILED DESCRIPTION OF THE INVENTION

In stage and theater lighting, it is well known to mount a gobo in a movable gobo holder so that when a light beam is passed through the gobo, an image is projected on a projection surface, which may be a solid surface or theatrical fog.

Figure 1:
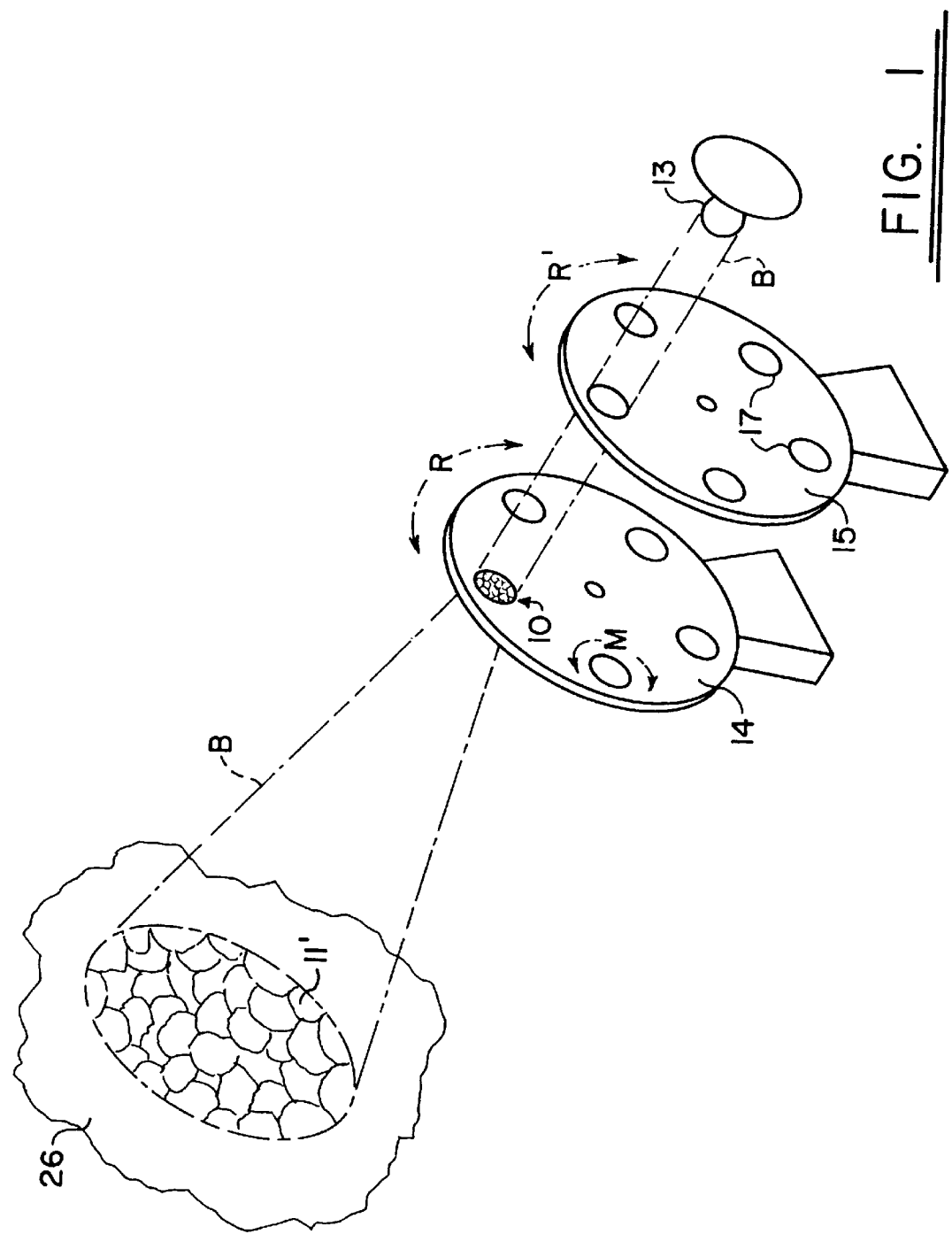
FIG. 1 is a schematic view illustrating a gobo movably mounted in a projected light path.
Figure 6:
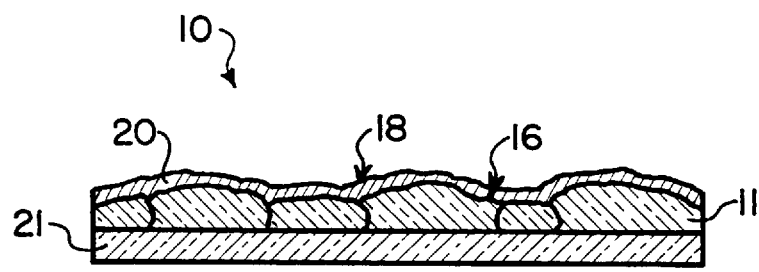
FIG. 6 is a cross-sectional view of an embodiment of the gobo of the present invention.
Figure 7:
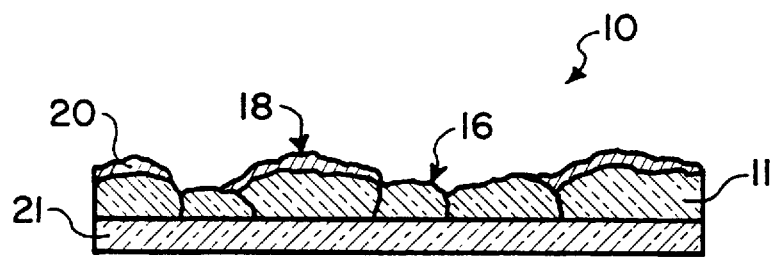
FIG. 7 is a cross-sectional view of an embodiment of the gobo of the present invention.

FIG. 1–7 illustrate that a fused glass light pattern generator comprises a disc-shaped gobo 10 including a plurality of fused glass particles 11 of various size such that gobo 10 has an uneven, multi-level surface sufficient to distort light in response to a light beam path, designated B, being passed therethrough.

Gobo 10 may be movably mounted in a gobo wheel 14 which bi-directionally rotates as indicated by the arrow designated R so that when gobo 10 is moved into the path of light beam B, generated from a light source 13, the selected gobo image is in position to be projected by the light. Present gobos 10 also bi-directionally rotate as indicated by the arrow designated M, independent of the wheel 14, once the gobo 10 is positioned in the beam B. Also, a color wheel 15, which includes a plurality of various colored discs 17, can be bi-directionally rotated as indicated by the arrow designated R' to vary color and enhance the light of beam B and the selected gobo image projected onto a projection surface 26.

The gobo 10 illustrated in FIG. 2 is formed of a plurality of various size fused glass particles 11 which are fused together into a disc-like shape by heating in a kiln to a sufficient temperature. The glass particles 11 are preferably a boro-silicate (glass) material and may be chips of glass coated at 18, FIG. 3, with a dichroic coating, a silver mirror coating, or may be uncoated clear glass or colored glass. When the glass particles 11 are fused together they form an irregular mass having an uneven, multi-level surface 16 see FIGS. 3, 5, 6 and 7. The coating 18 may be a substantially evenly applied coating 19, FIG. 6, applied after the glass particles 11 are fused together, or may be partially etched or polished away, as is illustrated by coating 20 in FIGS. 3 and 7, to provide enhanced color variations. However, if gobo 10 is formed of particles 11 which are originally chips of dichroic coated glass, further coating after being fused will most likely not be necessary to provide the desired color variation.

Preferably, gobo 10 is formed of glass particles 11 fused onto the surface of a substrate 21 also formed of boro-silicate. The use of a substrate 21 not only adds strength to gobo 10 but permits spacing between the particles 11 which in FIGS. 4 and 5 are various size clear glass beads fused to substrate 21. When particles 11 are fused together to form a disc-shaped gobo 10 without a substrate 21, the fusing process is best accomplished by placing particles in a metal ring-like mold to surround the particles and produce the disc shape.

Where the particles 11 are originally particles of dichroic coated glass, they are heated in a kiln to a temperature which causes the glass to begin to flow, thus smoothing the sharp edges and distorting the shape somewhat. When light is passed through the gobo 10, particles 11 distort the light beam and filter out some colors of the spectrum to create desired colored lighting effects. Distortion of the shape of the particles 11 by heating, also distorts or causes the color image produced by the glass to be non-homogeneous because of the use of a dichroic coating, especially at the edges of the particles. As an alternative to dichroic particles, the colored images could also be produced by a plurality of multi-colored glass, clear glass beads or chips which may be color enhanced by color filters 17 and further color enhanced by subsequent coating as mentioned above. In some instances, it will be advantageous if gobo 10 is flame annealed and then placed in a kiln for final annealing.

In accordance with the structural features of the present invention, gobo 10 can be placed in a gobo wheel 14 and positioned in light beam B, then rotated in position to provide the desired artistic lighting effect created by the choice of color filter 17, coating and shape of glass particles 11 and rotation of the gobo 10 in the directions designated M.

While this invention has been illustrated and described in accordance with a preferred embodiment, it is recognized that variations and changes may be made therein without departing from the invention as set forth in the claims.

Having described the invention, what is claimed is:

1. A gobo for generating light patterns when placed in the light beam of a light projection system comprising:
   a. a substrate layer with two opposing flat surfaces,
   b. particle layer including a plurality of multifaceted, three-dimensionally irregularly shaped particles which are fused into at least one surface of the substrate layer.

2. The gobo of claim 1 wherein:
   a. the substrate layer is composed of glass
   b. the plurality of multifaceted, three-dimensionally irregular particles are composed of glass.

3. The gobo of claim 1 wherein the glass particle layer is fused to the glass substrate layer.

4. The gobo of claim 1 wherein at least one of the plurality of multifaceted, three-dimensionally irregular particles has at least one surface which has a dichroic coating layer before it is fused into the substrate layer.

5. A gobo for generating light patterns when placed in the light beam of a light projection system comprising:
   a. a substrate layer with two opposing flat surfaces,
   b. particle layer including a plurality of multifaceted, three-dimensionally irregularly shaped particles which are fused into at least one surface of the substrate layer, and at least one of the plurality of multifaceted, three-dimensionally irregular particles has at least one surface which has a dichroic coating layer before it is fused into the substrate layer.

6. A gobo for generating light patterns when placed in the light beam of a light projection system comprising:
   a. a glass substrate layer, and
   b. a glass particle layer including a plurality of multifaceted, three-dimensionally irregularly shaped glass particles fused to the glass substrate layer and at least one of the glass particles has at least one surface which has a dichroic coating layer.

* * * * *